(12) United States Patent
Nozaki et al.

(10) Patent No.: US 7,907,188 B2
(45) Date of Patent: Mar. 15, 2011

(54) IMAGE REPRODUCTION DEVICE

(75) Inventors: Hirotake Nozaki, Port Washington, NY (US); Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 544 days.

(21) Appl. No.: 11/664,088

(22) PCT Filed: Sep. 29, 2005

(86) PCT No.: PCT/JP2005/017991
§ 371 (c)(1),
(2), (4) Date: May 3, 2007

(87) PCT Pub. No.: WO2006/038523
PCT Pub. Date: Apr. 13, 2006

(65) Prior Publication Data
US 2007/0296831 A1    Dec. 27, 2007

(30) Foreign Application Priority Data
Oct. 4, 2004    (JP) ................................. 2004-291784

(51) Int. Cl.
H04N 5/76    (2006.01)
(52) U.S. Cl. .............. 348/231.8; 348/211.13; 348/231.2; 348/231.7
(58) Field of Classification Search ............... 348/211.3, 348/231.99–231.8
See application file for complete search history.

(56) References Cited

U.S. PATENT DOCUMENTS

| | | | |
|---|---|---|---|
| 6,750,902 B1 | 6/2004 | Steinberg et al. | |
| 6,947,075 B1 * | 9/2005 | Niikawa | 348/211.14 |
| 2002/0054224 A1 * | 5/2002 | Wasula et al. | 348/232 |
| 2002/0140951 A1 | 10/2002 | Nihei | |
| 2004/0090528 A1 * | 5/2004 | Miyamoto | 348/207.1 |
| 2004/0189811 A1 * | 9/2004 | Ishiyama et al. | 348/207.2 |
| 2004/0223058 A1 * | 11/2004 | Richter et al. | 348/207.1 |
| 2007/0248285 A1 * | 10/2007 | Lippincott | 382/298 |

FOREIGN PATENT DOCUMENTS

| | | |
|---|---|---|
| GB | 2 391 352 A | 2/2004 |
| JP | A-05-091336 | 4/1993 |
| JP | A-09-009160 | 1/1997 |
| JP | A 2001-333369 | 11/2001 |
| JP | A 2002-132776 | 5/2002 |
| JP | A-2002-290710 | 10/2002 |
| JP | A 2003-163864 | 6/2003 |
| JP | A 2003-346089 | 12/2003 |
| JP | A 2004-009316 | 1/2004 |
| JP | A 2004-120463 | 4/2004 |
| WO | WO 01/86640 A2 | 11/2001 |

* cited by examiner

*Primary Examiner* — Sinh Tran
*Assistant Examiner* — Anthony J Daniels
(74) *Attorney, Agent, or Firm* — Oliff & Berridge, PLC

(57) ABSTRACT

An image reproduction device has a display interface, a data reading unit, an image processing section, a recording unit, and a control section. The display interface outputs to a monitor device including a display screen. The data reading unit reads data from an external recording device as well as including a connection section capable of electrically connecting the external recording device recording photographic image data. The image processing section generates monitor image data based on the photographic image data. The image size of the monitor image data corresponds to the image resolution of the monitor device. The recording unit records the monitor image data in a memory. The control section performs the reproduction mode in which a reproduction image based on the monitor image data is displayed on the monitor device. Besides, the control section is configured to produce a reproduction image when not connected with the external recording device.

16 Claims, 6 Drawing Sheets

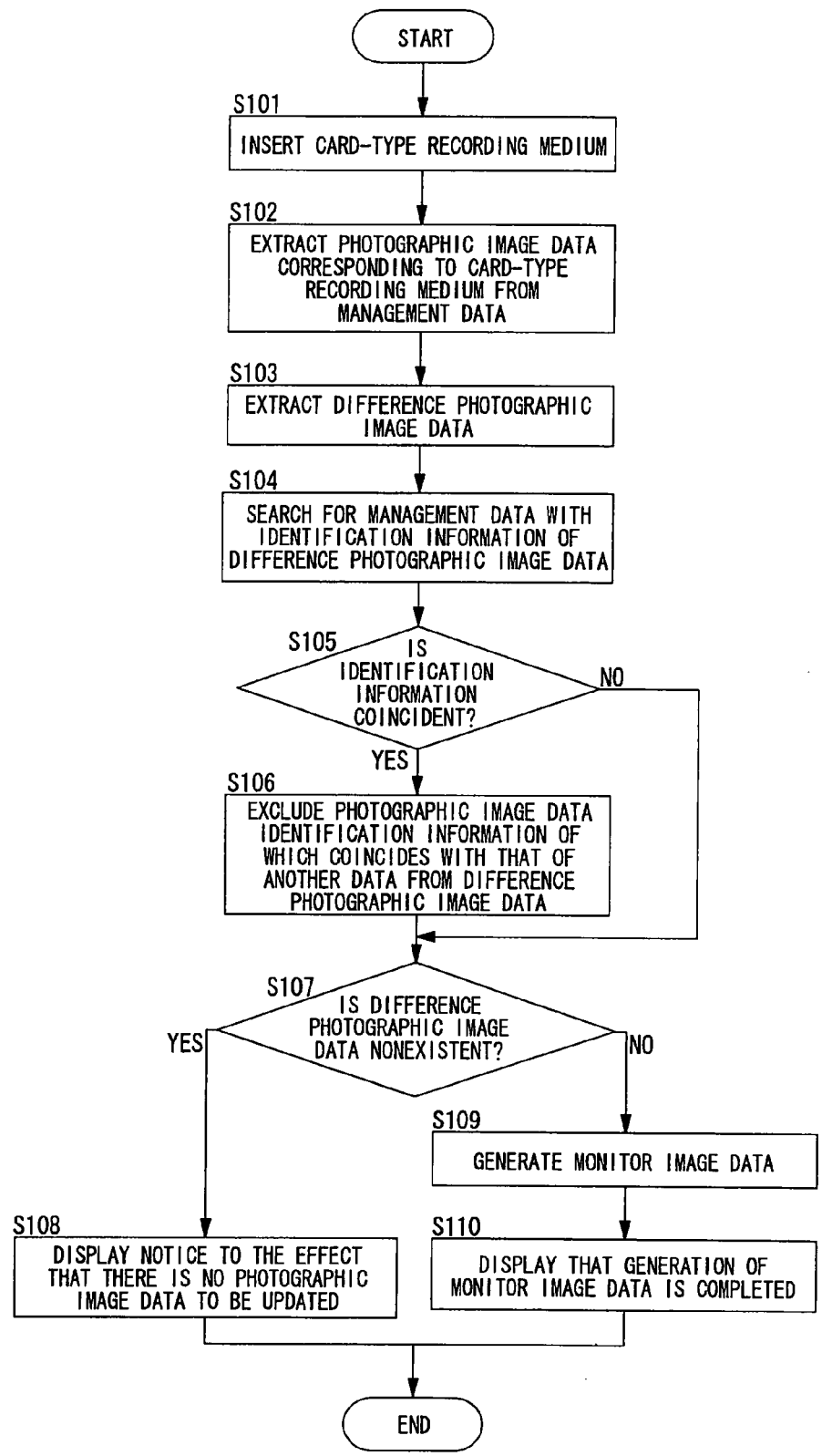
F I G. 4

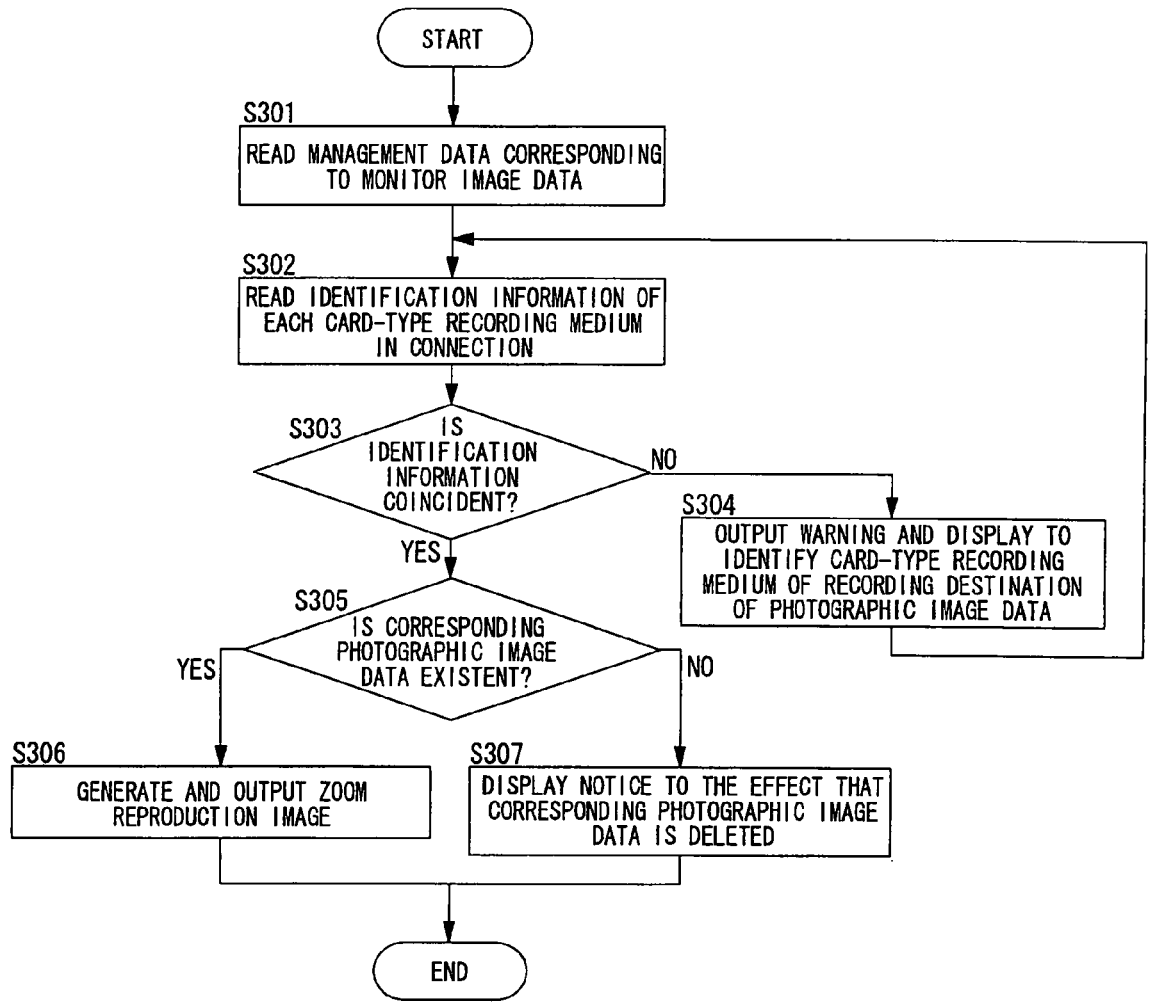
F I G. 6

IMAGE REPRODUCTION DEVICE

CROSS-REFERENCE TO RELATED APPLICATION

This application is a U.S. National Stage application claiming the benefit of prior filed International Application Number PCT/JP2005/017991, filed Sep. 29, 2005, in which the International Application claims a priority date of Oct. 4, 2004 based on prior filed Japanese Application Number 2004-291784, the entire contents of which are incorporated herein by reference.

TECHNICAL FIELD

The present invention relates to an image reproduction device that reads photographic image data from a card-type recording medium etc. and displays a reproduction image on a monitor device.

BACKGROUND ART

In recent years, an electronic camera is rapidly spreading, which records photographic image data of an object photographed by an image pickup device in a card-type recording medium, such as a semiconductor memory etc. It is general for a user of an electronic camera to transfer the photographic image data to a personal computer, etc., for management/storage thereof, however, in recent years, the number of users who utilizes the card-type recording medium as a final storage medium is also increasing. Then, an image reproduction device is also publicly known, which reads and reproduces to display photographic image data from a card-type recording medium for a user etc. who manages photographic image data in the card-type recording medium, as described above (refer to Patent Document 1 and Patent Document 2).

However, with the image reproduction device in the above-mentioned Patent Document 1 and Patent Document 2, it is not possible to reproduce and display photographic image data of the card-type recording medium in a state in which the card-type recording medium is not inserted. Because of this, when a user having many card-type recording media tries to reproduce specific photographic image data, prodigious labor is required in order to search for the card-type recording medium recording the photographic image data and in this point, there is room for improvement.

In particular, among users who use a card-type recording medium as a final storing medium, there are many users who feel reluctance to the operation of a personal computer and many users who dislike the complicated editing work etc. Because of this, it is desired to realize management of photographic image data with an easy unit.

Patent Document 1 Japanese Unexamined Patent Application Publication No. 2002-132776
Patent Document 2: Japanese Unexamined Patent Application Publication No. 2003-346089

DISCLOSURE OF THE INVENTION

Problems to Be Solved by the Invention

The present invention will solve the above-mentioned problems with the prior art and an object thereof is to provide an image reproduction device with which a user who manages photographic image data in a card-type recording medium can enjoy reproduction images without the need to search for a recording medium recording photographic image data.

Means for Solving the Problems

An image reproduction device according to a first embodiment has a display interface, a data reading unit, an image processing section, a recording unit, and a control section. The display interface performs outputting to a monitor device having a display screen. The data reading unit reads data from an external recording device as well as including a connection section capable of electrically connecting the external recording device recording photographic image data. The image processing section generates monitor image data based on the photographic image data. The image size of the monitor image data corresponds to the image resolution of the monitor device. The recording unit records the monitor image data in a memory. The control section carries out a reproduction mode in which a reproduction image based on the monitor image data is displayed on the monitor device. In addition, the control section is configured so as to be capable of reproducing a reproduction image even when not connected with the external recording device. Because of this, in the first invention, it is possible to view and listen to a reproduction image without the need to connect the external recording device recording photographic image data. In addition, in the first invention, the time taken until a reproduction image is displayed can be shortened compared to the case where the resolution of photographic image data is transformed each time and then the reproduction image is generated.

In a second invention, when the external recording device is connected electrically to the connection section, the image processing section automatically generates monitor image data based on data read from the external recording device by the data reading unit and the recording section records the monitor image data in a memory in the first invention. Because of this, in the second invention, the time taken until a reproduction image is displayed can be shortened compared to the case where the resolution of photographic image data is transformed each time and then the reproduction image is generated.

In a third invention, the control section records a relationship of correspondence between identification information relating to the photographic image data the monitor image data of which has already been generated and the external recording device of the recording destination of the photographic image data in the first invention. In addition, the control section extracts difference photographic image data newly recorded in the external recording device based on the identification information of the photographic image data when the external recording device is connected. The image processing section generates the monitor image data of the difference photographic image data. Because of this, in the third invention, it is unlikely that monitor image data that is a duplicate of the photographic image data read in the past from the same recording medium is generated.

In a fourth invention, the control section excludes, among the extracted difference photographic image data, photographic image data the identification information of which coincides with that of the photographic image data the recording destination of which is different from the difference photographic image data in the third invention. Because of this, in the fourth invention, even when the same photographic image data is recorded in two or more different recording media, it is unlikely that duplicated monitor image data is generated.

In a fifth invention, the image reproduction device further has an output interface capable of connecting a printer in any one of the first to fourth inventions. The control section outputs the photographic image data corresponding to the reproduction image to the printer when there is a printing direction of the reproduction image in the reproduction mode. In addition, the control section causes the monitor device to output a warning display when the photographic image data cannot be read.

In a sixth invention, the image processing section reads the photographic image data corresponding to the reproduction image to generate a zoom image of the reproduction image in the reproduction mode in any one of the first to fourth inventions. The control section causes the monitor device to output a warning display when the photographic image data cannot be read.

In a seventh invention, the control section records data relating to the external recording device of the recording destination of the photographic image data corresponding to the monitor image data in the memory in the fifth or sixth invention. The control section causes the monitor device to output a display indicative of the external recording device of the recording destination of photographic image data when the photographic image data cannot be read. Because of this, in the seventh invention, it is made easier for the user to search for the external recording device recording desired photographic image data.

In an eighth invention, the control section records data relating to the external recording device of the recording destination of the photographic image data corresponding to the monitor image data in the memory in any one of the first to fourth inventions. The control section causes display data to be output, which is indicative of the external recording device of the recording destination of the photographic image data corresponding to the reproduction image being displayed in the reproduction mode. Because of this, in the eighth invention, it is made easier for the user to search for the external recording device recording desired photographic image data.

In a ninth invention, the recording unit has a connector in any one of the first to eighth inventions. Then, the memory is connected to the image reproduction device in an exchangeable manner via the connector. Because of this, in the ninth invention, the expandability of the image reproduction device is increased by exchange of memories.

In a tenth invention, the control section is capable of duplicating data recorded in the memory before exchange in the memory after exchange in the ninth invention. Because of this, in the tenth invention, it is possible to take over the monitor image data etc. even when memories are exchanged.

In an eleventh invention, the display interface detects the image resolution of the monitor device in any one of the first to tenth inventions. The image processing section generates the monitor image data of an image size corresponding to the detected image resolution. Because of this, in the eleventh invention, monitor image data with a proper resolution is generated in accordance with the monitor device with which to view and listen to the reproduction image.

In a twelfth invention, the image reproduction device further has an input section capable of specifying an image size of the monitor image data in any one of the first to tenth inventions. The image processing section generates the monitor image data of the specified image size. Because of this, in the twelfth invention, the monitor image data is generated with the resolution that reflects the user's intention.

In a thirteenth invention, the image processing section generates monitor image data of an image size with the highest resolution among the standards of the monitor device in any one of the first to tenth inventions. In addition, the image processing section transforms the image size of the monitor image data into the image resolution of each monitor device to generate a reproduction image at the time of reproduction. Because of this, in the thirteenth invention, it is possible to view and listen to a reproduction image with a high resolution corresponding to a monitor device even when the monitor device to be connected is changed to that with a high resolution.

In a fourteenth invention, the image processing section determines the image size of the monitor image data based on the maximum recording capacity of the memory in the ninth or tenth invention. Because of this, in the fourteenth invention, when the maximum recording capacity of the memory is small, it is possible to give priority to the number of frames of the monitor image data by reducing the image size.

Here, the "external recording device" of the present invention includes an electronic camera or a computer to be connected with the image reproduction device via a publicly-known communication line, in addition to the recording medium. The above-mentioned communication line may be wired or wireless. In addition, the above-mentioned recording medium is one capable of recording photographic image data, and is, for example, most preferably, a card-type recording medium (nonvolatile semiconductor memory or Microdrive (registered trademark), etc.) generally used in an electronic camera and capable of being rewritten. By the way, the recording medium is not limited to the card-type recording medium, but may be, for example, another publicly-known recording medium, such as a magnetic tape, magnetic disk, magneto-optical disk, optical disk, etc.

With the present invention, it is possible to view and listen to a reproduction image without the need to connect an external recording device recording photographic image data. Because of this, it is possible for a user to enjoy a desired reproduction image without the need to search for the external recording device recording photographic image data from among many external recording devices.

BRIEF DESCRIPTION OF THE DRAWINGS

The nature, principle and utility of the invention will become more apparent from the following detailed description when read in conjunction with the accompanying drawings in which like parts are designated by identical reference numbers, in which:

FIG. 4 is a flow diagram of the operation of generation of monitor image data in the present embodiment;

FIG. 6 is a flow diagram showing the operation of generation of a zoom reproduction image.

BEST MODE FOR CARRYING OUT THE INVENTION

Embodiments of the present invention are explained below in detail based on the drawings.

(Configuration of image reproduction device in the present embodiment)

Figure 1:
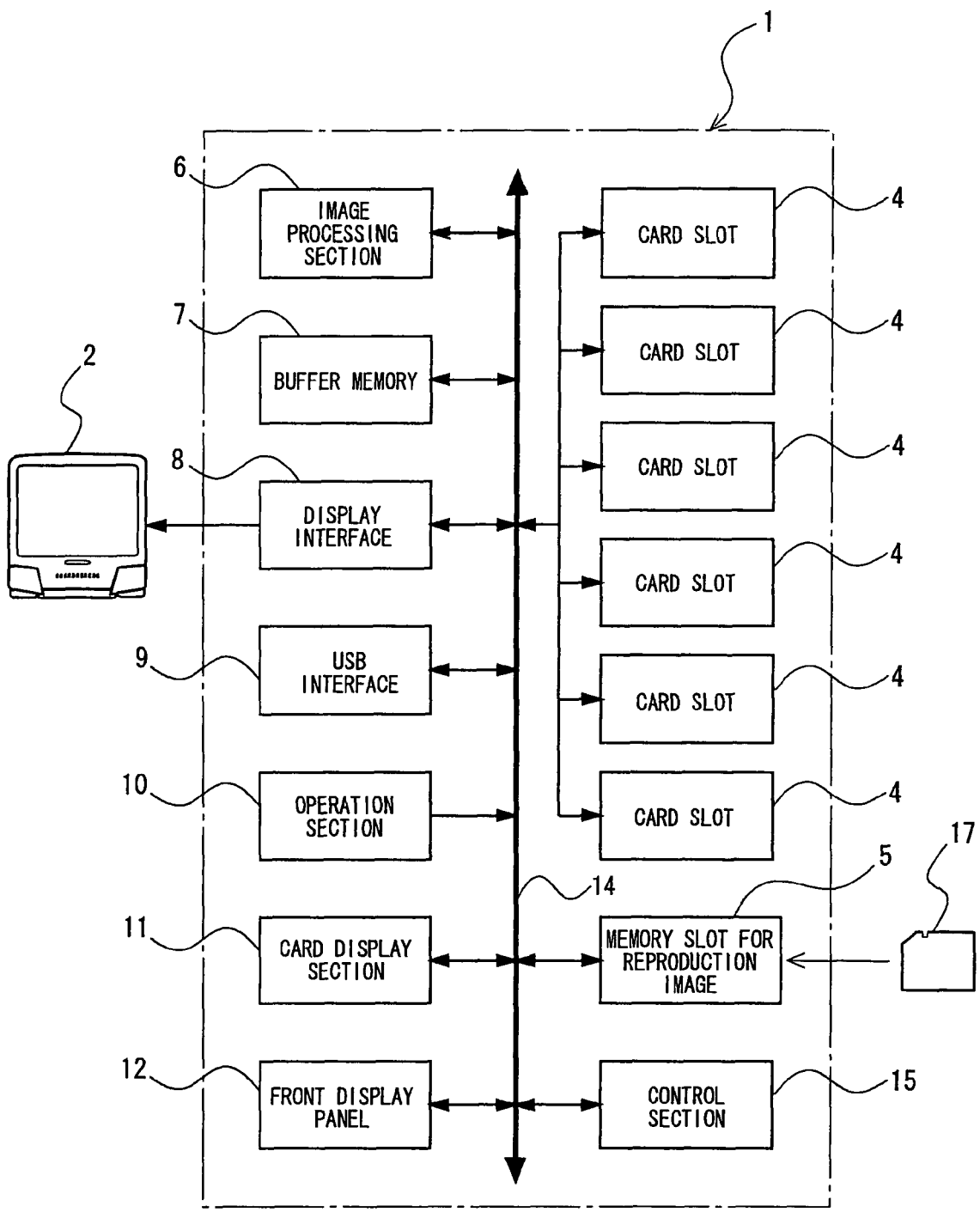
FIG. 1 is a block diagram of an image reproduction device in the present embodiment.
Figure 2:
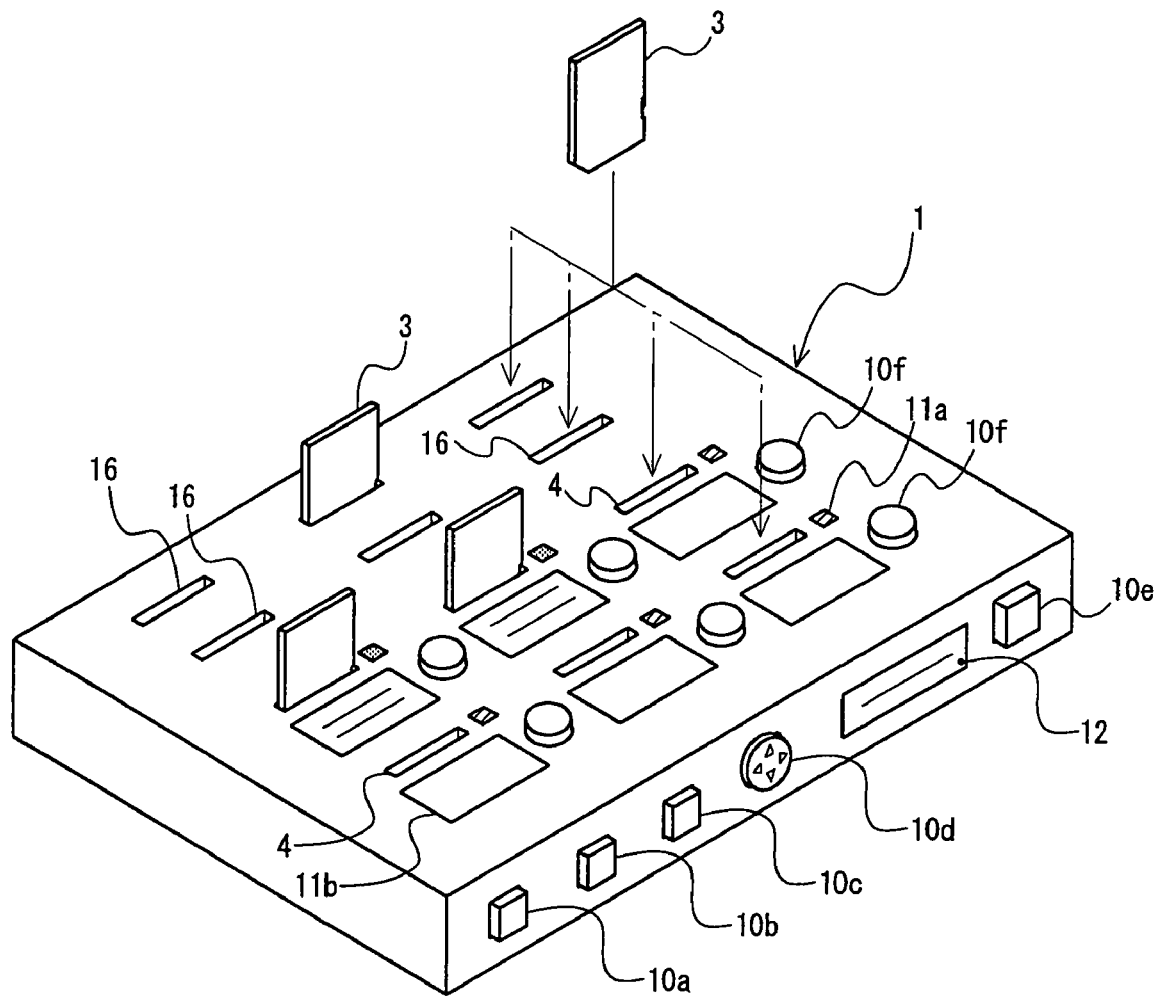
FIG. 2 is a perspective view showing an outside appearance of the image reproduction device in the present embodiment.

FIG. 1 is a block diagram of an image reproduction device in the present embodiment and FIG. 2 is a perspective view showing an outside appearance of the image reproduction device in the present embodiment. An image reproduction device 1 in the present embodiment is connected to a TV (monitor) 2 etc. The image reproduction device is capable of reading photographic image data photographed by an electronic camera from a publicly-known card-type recording medium 3 (semiconductor memory, Microdrive (registered trademark), etc.) electrically connected thereto. Then, the image reproduction device 1 displays a reproduction image of photographic image data on the TV 2.

The image reproduction device 1 in the present embodiment has a plurality of card slots 4, a memory slot for reproduction image 5, an image processing section 6, a buffer memory 7, a display interface 8, a USB interface 9, an operation section 10, a card display section 11, a front display panel 12, a data bus 14 that connects each section, and a control section 15.

A total of the six slot cards 4, three in the front and three in the rear on the top surface of the case of the image reproduction device, are provided. To each of the card slots 4, the card-type recording medium 3 is connected detachably. Inside the card slot 4, an electric contact (its drawing is omitted) connected with the data bus 14 is formed. Via the electric contact of the card slot 4, data is read and written between the card-type recording medium 3 and the image reproduction device 1.

In addition, on the top surface of the case of the image reproduction device 1, a plurality of dummy slots 16 are formed behind the card slots 4 (refer to FIG. 2). This dummy slot 16 serves as a card stand to which the card-type recording medium 3 is inserted for storage, not having a data read/write function. In addition, in order to improve the identity recognizability of the card-type recording medium 3, the depth of insertion of the card slot 4 and the dummy slot 16 is set to a depth at which a pasted label can be recognized visually in a state in which the card-type recording medium 3 is inserted.

The memory slot for reproduction image 5 is formed on the rear side of the case of the image reproduction device 1 (its drawing is omitted). The memory slot for reproduction image 5 is constituted in the same manner as that of the above-mentioned card slot 4. In the card-type recording medium (hereinafter, referred to as a card-type recording medium for reproduction image 17) inserted into the memory slot for reproduction image 5, monitor image data and management data, to be described later, are recorded.

The image processing section 6 is an image processing ASIC having a compression/decompression circuit etc. The image processing section 6 generates monitor image data by transforming the resolution of the photographic image data read from the card-type recording medium 3 of the card slot. In addition, the image processing section 6 outputs image signals of a reproduction image based on the monitor image data. By the way, the buffer memory 7 is a memory that temporarily saves image data during the processing of the image processing section 6 and stores various setting contents of the device.

The display interface 8 is an interface that outputs image signals of the image processing section 6 to the TV 2. This display interface 8 has the publicly-known video output terminal, such as a composite video terminal, separate video terminal, component video terminal, D video terminal, etc. In addition, the display interface 8 is configured so as to be capable of detecting the video output terminal connected with the TV 2 based on the output of the plug insert detection pin of, for example, the D video terminal. By the way, in the present embodiment, each video output terminal of the display interface 8 is formed on the rear side of the case of the image reproduction device 1.

The USB interface 9 controls transmission/reception of data with peripherals (for example, a photo printer etc.) connected to the image reproduction device 1 in conformity of the communication standards of USB (Universal Serial Bus). By the way, in the present embodiment, the USB connection terminal of the USB interface 9 is formed on the rear side of the case of the image reproduction device 1.

The operation section 10 has a slide show button 10a, a print button 10b, a delete button 10c, a cursor key 10d, and a power supply button 10e arranged on the front of the case, and six reproduction buttons 10f arranged on the top surface of the case.

The slide show button 10a is a button configured to produce a slide show display by sequentially reading the monitor image data recorded in the card-type recording medium for reproduction image 17 at predetermined time intervals. The print button 10b is a button configured to direct printing of an image currently being reproduced. The delete button 10c is a button configured to direct deletion of the monitor image data (or the photographic image data) of the image currently being reproduced. The cursor key 10d is used when the cursor displayed on the screen in the setting mode is moved etc. In addition, the reproduction button 10f corresponds to each card slot 4, respectively, and used to produce a reproduction display of the image of the card-type recording medium 3 of each card slot 4.

The card display section 11 is constituted by a set of an access lamp 11a and a liquid crystal display section 11b. Six sets of the card display section 11 are arranged in the vicinity of each card slot 4 on the top surface of the case and each card display section 11 corresponds to each card slot 4.

The access lamp 11a lights up in the state in which the card-type recording medium 3 is inserted into the card slot 4 and blinks at the time of read and write of the card-type recording medium 3. In addition, the access lamp 11a changes the colors when lit up in accordance with the vacant capacity of the card-type recording medium 3. Consequently, it is possible for a user to identify the card-type recording medium 3 having a predetermined vacant capacity at a glance.

Figure 3:
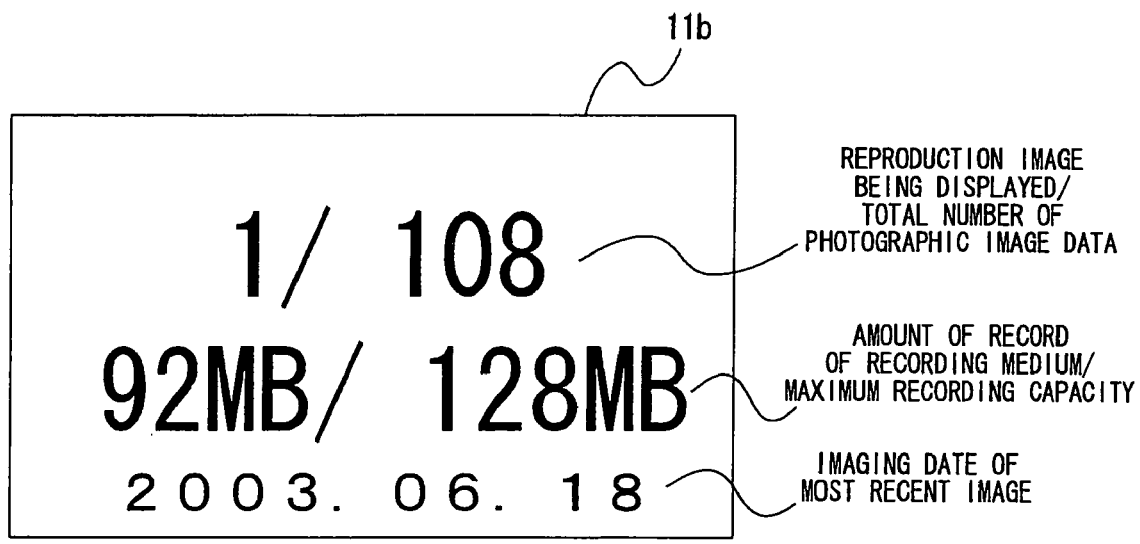
FIG. 3 is a diagram of a display example of a liquid crystal display section.

On the other hand, on the liquid crystal display section 11b, the maximum recording capacity of the card-type recording medium 3, the amount of records at present, and the most recent imaging date among the card-type recording media 3 are displayed. In addition, on the liquid crystal display section 11b, in the case of the reproduction display by the reproduction button 10f, the number of the reproduction image being displayed and the total number of photographic image data recorded in the card-type recording medium 3 are displayed (refer to FIG. 3). In addition, the front display panel 12 is a liquid crystal display section arranged on the front of the case. On the front display panel 12, in the case of the slide show display by the slide show button 10a, the number of the reproduction image being displayed and the total number of monitor image data are displayed.

The control section 15 carries out mode switching between, for example, the "reproduction mode" in which a reproduction image is displayed, the "setting mode" in which various settings etc. of the image reproduction device 1 are made while referring to the setting screen of the TV 2, etc, or carries out the operation control of each section, such as the display control of the card display section 11 and the front display panel 12. In addition, the control section 15 has a backup function to duplicate the record data of the card-type recording medium for reproduction image 17 mounted on the memory slot for reproduction image 5 and electrically connected thereto into the card-type recording medium 3 of the card slot 4 or a new card-type recording medium for reproduction image 17 after exchange.

Further, the control section 15 generates management data for each monitor image data and records the management data in the card-type recording medium for reproduction image 17. Here, the management data includes identification information (for example, file name, imaging date/time, data amount, kind of file, etc.) about the photographic image data corresponding to the monitor image data and identification information of the card-type recording medium 3 of the card slot 4, which is the recording destination of the photographic image data. In the card-type recording medium for reproduction image 17, the identification information about the photographic image data described above and the identification information of the card-type recording medium 3 described above are associated with each other and recorded.

Here, for example, the inherent data (manufacturer of the card-type recording medium 3, the serial number of each card, the capacity, etc.) recorded in a register inside the card or the data of the volume name corresponds to the identification information of the card-type recording medium 3. By the way, when the card-type recording medium 3 is connected to the card slot 4 for the first time, it may also be possible for the control section 15 to write the unique information to identify each card as the identification information of the card-type recording medium 3 to the card-type recording medium 3 connected to the card slot 4 and record the data corresponding to the unique information in the management data of the card-type recording medium for reproduction image 17 mounted on the memory slot for reproduction image 5.

(Operation of Generation of Monitor Image Data)

The operation of generation of monitor image data in the present embodiment is explained below following the flow diagram in FIG. 4.

The user mounts the card-type recording medium 3 recording photographic image data to the card slot 4 (S101). The control section 15 detects that the card-type recording medium 3 is mounted. Based on this, the control section 15 confirms that the card-type recording medium 3 is connected electrically to the card slot 4. Then, after the above-mentioned operation of confirmation, the control section 15 starts data transmission/reception with the mounted card-type recording medium 3 via the card slot 4 and the data bus 14.

Next, the control section 15 reads the identification information of the inserted card-type recording medium 3. In addition, the control section 15 searches for the management data recorded in the card-type recording medium for reproduction image 17 mounted to the memory slot for reproduction image 5. Then, the control section 15 extracts the identification information of the photographic image data corresponding to the card-type recording medium 3 mounted to the card slot 4 in S101 from the management data of the card-type recording medium for reproduction image 17 (S102).

The control section 15 reads the identification information of the photographic image data currently recorded in the card-type recording medium 3 of the card slot 4 from the card-type recording medium 3 of the card slot 4. The control section 15 collates it with the identification information of the photographic image data in S102 recorded in the card-type recording medium for reproduction image 17. Then, the control section 15 extracts the difference photographic image data newly recorded in the card-type recording medium 3 of the card slot 4 based on the result of collation (S103). In other words, in the stage in S103, the monitor image data is generated excluding the photographic image data read in the past from the same recording medium, as a result.

The control section 15 collates the identification information of each difference photographic image data with the identification information of the photographic image data the recording destination of which is different on the management data recorded in the card-type recording medium for reproduction image 17 (S104). By the way, in the stage in S103, when there exists no difference photographic image data, the control section 15 moves the process to S107 without executing the process in S104.

The control section 15 determines whether or not there is data the identification information of the photographic image data of which coincides with that of another data in the management data in S105. When there is data the identification information of the photographic image data of which coincides with that of another data (YES side), the control section 15 excludes all the photographic image data the identification information of the photographic image data of which coincides with that of another data in S104 from the difference photographic image data (S106). In other words, in the stage in S106, when the same photographic image data is recorded in two or more different recording media, the generation of the duplicated monitor image data is excluded. On the other hand, when there is no data the identification information of the photographic image data of which does not coincide with that of any data (NO side), the control section 15 moves the process to S107.

The control section 15 determines whether or not the difference photographic image data is nonexistent in the card-type recording medium 3 in S101 mounted to the card slot 4 (S107). When the difference photographic image data is nonexistent (YES side), the control section 15 causes the TV 2 to produce a display to the effect that "No photographic image data to be updated" (S108), and then, terminates the operation of generation of the monitor image data. On the other hand, when the difference photographic image data is existent (NO side), the control section 15 directs the image processing section 6 to generate monitor image data based on the difference photographic image data (S109).

Here, the image size of the monitor image data the image processing section 6 generates in S109 is determined by either of the following methods (1) to (4).

(1) As a first method, the display interface 8 detects the video output terminal connected with the TV 2. Then, the image processing section 6 determines the image size of the monitor image data in accordance with the image resolution (number of pixels) corresponding to the video output terminal.

Specifically, when the display interface 8 detects the connection of D1 or D2 video terminal, the image processing section 6 sets the image size to 640×480 for the photographic image data the aspect ratio of which is 4:3, and sets the image size to 720×480 for the photographic image data the aspect ratio of which is 3:2. In addition, when the connection of D4 video terminal is detected, the image processing section 6 sets the image size to 960×720 for the photographic image data the aspect ratio of which is 4:3, and sets the image size to 1080×720 for the photographic image data the aspect ratio of which is 3:2.

Further, when the connection of D3 or D5 video terminal is detected, the image processing section 6 sets the image size to 1440×1080 for the photographic image data the aspect ratio of which is 4:3, and sets the image size to 1620×1080 for the photographic image data the aspect ratio of which is 3:2. On the other hand, when any connection of the video terminal is not detected, the image processing section 6 sets the image size to 640×480 for the photographic image data the aspect ratio of which is 4:3, and sets the image size to 720×480 for the photographic image data the aspect ratio of which is 3:2.

(2) As a second method, it may also be possible to provide an item to specify the image size of the monitor image data in the setting mode and cause the image processing section 6 to generate monitor image data of the image size specified by the user. By the way, the specification of the image size in the setting mode may be done by the user's selection from among a plurality of candidates of the image size prepared in advance, or the image size may be specified by the user's inputting a numeric value and may be changed freely.

(3) As a third method, it may also be possible for the image processing section 6 to generate monitor image data in accordance with the image size with the highest resolution (number of pixels) of the standards of the video terminals at the rear side of the case. For example, when the image reproduction device 1 has the D video terminals from D1 to D4, the image processing section generates monitor image data of the image size corresponding to the resolution of the D3 video terminal. By the way, when the resolution of the TV and the image size of the monitor image data do not coincide with each other when the monitor image data is reproduced, the image processing section 6 thins and display the reproduction image in accordance with the resolution of the connected TV 2.

(4) As a fourth method, it may also be possible for the image processing section 6 to determine the image size based on the maximum recording capacity of the card-type recording medium 17 of the memory slot for reproduction image 5. For example, when the maximum recording capacity of the card-type recording medium 17 is equal to or less than 64 MB, the image size may be set to 640×480 (or 720×480) and increased stepwise as the recording capacity of the card-type recording medium 17 increases.

Then, after the above-mentioned generation of monitor image data is completed, the control section 15 causes the TV 2 to display a display to the effect that "Generation of monitor image data is completed" (S110). As described above, the operation of generation of monitor image data is completed. By the way, the monitor image data generated in this manner is recorded in the card-type recording medium for reproduction image 17 of the memory slot for reproduction image 5.

(Operation of Reproduction of Monitor Image Data)

Next, the operation of reproduction of monitor image data in the present embodiment is explained.

In the reproduction mode, the control section 15 reads monitor image data from the card-type recording medium for reproduction image 17 of the memory slot for reproduction image 5. The image processing section 6 outputs the image signal of the reproduction image based on the monitor image data. Due to this, the reproduction image is displayed on the TV 2. Consequently, even if the card-type recording medium 3 is not connected to the card slot 4, it is possible for the user to enjoy a desired reproduction image.

In addition, in the reproduction mode, based on management data, it is possible for the control section 15 to search for the recording destination of the photographic image data corresponding to the reproduction image to be reproduced and displayed on the TV 2 and display a display relating to the card-type recording medium 3 of the recording destination on the TV 2. For example, the control section 15 displays the capacity of the card-type recording media 3, manufacturer, volume name, etc., on the TV 2 based on the identification information of the card-type recording medium 3 in the management data. Consequently, due to such a display, it is made easy for the user to search for the card-type recording medium 3 recording desired photographic image data. By the way, in the reproduction mode, it is also possible for the control section 15 to produce an index reproduction display that displays a list of a plurality of reduced images of monitor image data. In this case, the reduced images are generated by the image processing section 6 transforming the resolution (number of pixels) of the monitor image data recorded in the card-type recording media for reproduction image 17.

In addition, when the user presses the slide show button 10*a*, the control section 15 starts a slide show that sequentially displays all of the reproduction images of the monitor image data based on the management data. It is possible for the control section 15 to appropriately change the order of the displays in the slide show by rearranging the management files on the condition that the photographic image data is displayed in order of file name or imaging date/time. By the way, in the above-mentioned slide show, the number of the reproduction image being displayed and the total number of monitor image data are displayed on the front display panel 12.

Further, in a state in which the card-type recording medium 3 is connected to the card slot 4, the control section 15 reads the maximum recording capacity, the vacant capacity, the most recent imaging date of the card-type recording medium 3 from the card-type recording medium 3 and displays the information on the card display section 11*b*. A configuration may be possible in which the control section 15 displays this information on the TV 2 together with the reproduction image. In addition, when the user presses the reproduction button 10*f* in a state in which the card-type recording medium 3 is mounted (connected) to the card slot 4, the control section 15 sequentially displays the reproduction image corresponding to the card slot 4 on the TV 2.

Specifically, by the input of the reproduction button 10*f*, the control section 15 reads identification information from the card-type recording medium 3 of the card slot 4. The control section 15 extracts monitor image data corresponding to the card-type recording medium 3 from among the monitor image data recorded in the card-type recording medium for reproduction image 17 based on the management data. Then, the image processing section 6 sequentially outputs the reproduction image signals of the extracted monitor image data on TV 2. Consequently, it is possible for the user to easily grasp what kind of photographic image data is recorded in the card-type recording medium 3 mounted (connected) to the card slot 4 by pressing the reproduction button.

The above-mentioned display processing of reproduction image on the TV 2 is carried out by the image processing section 6 based on the monitor image data recorded in the card-type recording medium for reproduction image 17. It may also be possible to cause the display processing of the reproduction image to be carried out automatically by the image processing section 6 when the card-type recording medium 3 is mounted (or when data is being read) without accepting an input direction of transfer record or reproduction. Because of this, it is possible to swiftly display the reproduction image compared with the case where photographic image data is read from the card-type recording medium each time reproduction is directed and monitor image data is generated by the transformation of the number of pixels.

In addition, it is also possible to print the reproduction image or produce a zoom display of the reproduction image by performing a predetermined operation during the display of each reproduction image. In these cases, the control section 15 reads photographic image data corresponding to the reproduction image from the card-type recording medium 3 of the card slot 4. Then, the control section 15 carries out the printing outputting to a printer or the generation of a zoom display image by the image processing section. Consequently, it is possible for the user to obtain prints of high quality and improve the resolution of the zoom reproduction image at the time of printing or zoom reproduction by using photographic image data with high resolution.

Figure 5:
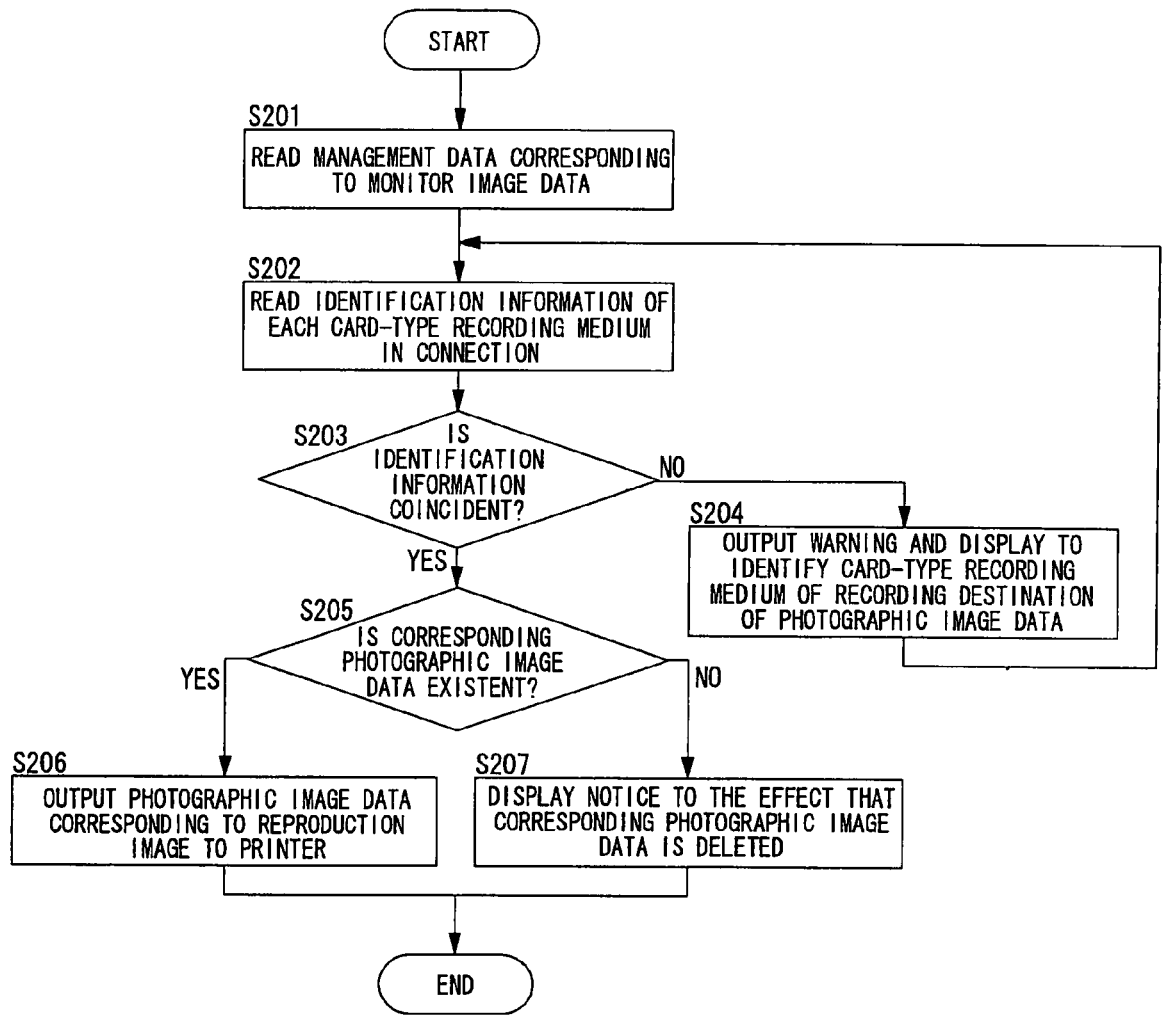
FIG. 5 is a flow diagram showing the operation at the time of printing direction of a reproduction image.

FIG. 5 is a flow diagram showing the operation when directing printing of a reproduction image. When the user presses the print button 10b during the display of the reproduction image, the control section 15 reads management data corresponding to the monitor image data being reproduced (identification information of photographic image data corresponding to the reproduction image and identification information of the card-type recording medium of the recording destination) from the card-type recording medium for reproduction image 17 (S201). Next, the control section 15 reads identification information of the card-type recording medium 3 connected to each of the card slots 4 from each of the card-type recording media 3 (S202).

The control section 15 collates the identification information of the card-type recording media in S201 and S202 with each other. Then, the control section 15 determines whether or not the card-type recording medium 3, which is the recording destination of photographic image data corresponding to the monitor image data being reproduced, is connected (whether or not the identification information coincides with each other) (S203). When connected (YES side), the process is moved to S205. On the other hand, when not connected (NO side), the control section 15 displays a warning that "Insert the card-type recording medium of photographic image data corresponding to the image being displayed" and a display to identify the card-type recording medium 3 of the recording destination on the TV 2 (S204) and then returns the process to S202.

The control section 15 reads and searches for identification information of photographic image data of the card-type recording medium 3 the identification information of the card-type recording medium which is coincident and determines whether or not there exists photographic image data corresponding to the reproduction image (S205). When there exists photographic image data (YES side), the control section 15 reads photographic image data corresponding to the reproduction image from the card-type recording medium 3 and outputs it to a printer connected via the USB interface 9 (S206). On the other hand, when there exists no photographic image data (NO side), the control section 15 displays a notice to the effect that "The photographic image data corresponding to the reproduction image is deleted" on the TV 2 (S207). As described above, a series of operation when printing is directed is completed.

FIG. 6 is a flow diagram showing the operation of generation of a zoom reproduction image. By the way, FIG. 6 approximately coincides with FIG. 5 except in that the image processing section 6 generates a zoom reproduction image based on photographic image data corresponding to the reproduction image and the control section 15 outputs the zoom reproduction image to the TV 2 (S306), and therefore, its detailed explanation is omitted.

By the way, in the case of a configuration in which the scale of zoom is variable, the control section 15 changes the read region of photographic image data recorded in the card-type recording medium 3 in accordance with the operation of change in the scale of zoom. Then, after the image processing section 6 carries out transformation processing of the resolution (number of pixels) so that the resolution coincides with the number of display pixels of the TV 2, the control section 15 outputs the zoom reproduction image on the TV 2.

By the way, the displays in the above-described S204, S207, S304, and S307 may be displayed on another display device, such as, for example, the front display panel 12, instead of the TV 2.

(Supplementary Items of Embodiments)

As described above, although the present invention is explained with the above-mentioned embodiments, the technical scope of the present invention is not limited to the above-mentioned embodiments.

(1) The number of card slots of the image reproduction device of the present invention is not limited to the embodiments and can be increased or decreased by changing the design. For example, the number of card slots of the image reproduction device may be one in the present invention. In addition, the identification information about photographic image data in the management data is not limited to the above-mentioned embodiments and for example, it may be data such as a shooting condition etc. to be recorded in an image file of the Exit standard.

(2) In the above-mentioned embodiments, it may also be possible to cause monitor image data and management data to be recorded in the buffer memory built in the present device. By the way, it is desirable that the buffer memory is a non-volatile memory that retains the recorded contents even if power is not supplied.

(3) In the operation of generation of monitor image data in the above-mentioned embodiments, when the image size of photographic image data is less than the determined image size, the photographic image data may be recorded. In addition, when recording the generated monitor image data and if the memory of the card-type recording medium for reproduction image becomes short in capacity, a warning display may be displayed on the TV or the past monitor image data may be deleted sequentially.

(4) In the operation of reproduction of monitor image data in the above-mentioned embodiments, when the photographic image data corresponding to the reproduction image being displayed is not detected (S207, S307), it may also be possible to carry out the printing outputting and the generation of the zoom reproduction image based on the monitor image data. In addition, in the operation of reproduction of monitor image data, it may also be possible to display the slide show display from the portion aborted halfway by storing data of order of display and the progress of reproduction in the buffer memory.

(5) The image reproduction device of the present invention is not limited to the configuration in which the photographic image data is read from the card-type recording medium of the card slot. For example, a configuration may also be possible, in which the image reproduction device reads photographic image data from a computer or an electronic camera connected via the USB interface. In addition, for example, a configuration may also be possible, in which the image reproduction device reads photographic image data from a computer or an electronic camera connected by a wireless LAN (both are not shown).

The invention is not limited to the above embodiments and various modifications may be made without departing from the spirit and scope of the invention. Any improvement may be made in part of all of the components.

The invention claimed is:

1. An image reproduction device comprising:
   a data reading unit that reads data from an external recording device as well as having a connection section capable of electrically connecting said external recording device recording photographic image data;

an image processing section that generates monitor image data based on said photographic image data, wherein an image size of the monitor image data corresponds to an image resolution of a monitor device having a display screen;

a recording unit that records said monitor image data in a nonvolatile memory; and a control section that carries out a reproduction mode in which the control section reads said monitor image data from the nonvolatile memory and in which a reproduction image based on said monitor image data recorded within said nonvolatile memory is displayed on said monitor device, wherein said control section reproduces said reproduction image even when said external recording device is not connected to said connection section, said control section records a relationship of correspondence between identification information relating to said photographic image data, said monitor image data of which has already been generated, and an external recording device of a recording destination of said photographic image data in said nonvolatile memory, when said external recording device is connected to said connection section, said control section extracts difference photographic image data newly recorded in said external recording device based on the identification information of said photographic image data and determines whether said difference photographic image data is nonexistent in said external recording device, in which when said difference photographic image data is nonexistent, said control section causes said monitor device to output a display indicative of no photographic image data to be updated and terminates an operation of generation of said monitor image data, and when said difference photographic image data exists, said image processing section generates said monitor image data of said difference photographic image data, and when said external recording device is connected electrically to said connection section, said image processing section automatically generates said monitor image data based on said data read from said external recording device by said data reading unit, and said recording unit records said monitor image data in said nonvolatile memory.

2. The image reproduction device according to claim 1, wherein:
said control section excludes, among said extracted difference photographic image data, photographic image data said identification information of which coincides with that of said photographic image data the recording destination of which is different from said difference photographic image data.

3. The image reproduction device according to claim 1, further comprising an output interface capable of connecting a printer, wherein:
said control section outputs said photographic image data corresponding to said reproduction image to said printer when there is a printing direction of said reproduction image in said reproduction mode, and causes said monitor device to output a warning display when said photographic image data cannot be read.

4. The image reproduction device according to claim 3, wherein:
said control section causes said monitor device to output a display indicative of an external recording device of a recording destination of photographic image data when said photographic image data cannot be read.

5. The image reproduction device according to claim 1, wherein:
said image processing section reads said photographic image data corresponding to said reproduction image to generate a zoom image of said reproduction image in said reproduction mode; and
said control section causes said monitor device to output a warning display when said photographic image data cannot be read.

6. The image reproduction device according to claim 5, wherein:
said control section causes said monitor device to output a display indicative of an external recording device of a recording destination of photographic image data when said photographic image data cannot be read.

7. The image reproduction device according to claim 1, wherein:
said control section causes display data to be output, which is indicative of an external recording device of a recording destination of said photographic image data corresponding to a reproduction image being displayed in said reproduction mode.

8. The image reproduction device according to claim 1, wherein:
said recording unit has a connector; and
said nonvolatile memory is connected to said image reproduction device in an exchangeable manner via said connector.

9. The image reproduction device according to claim 8, wherein:
said control section is capable of duplicating data recorded in said nonvolatile memory before exchange in said nonvolatile memory after exchange.

10. The image reproduction device according to claim 8, wherein:
said image processing section determines the image size of said monitor image data based on the maximum recording capacity of said nonvolatile memory.

11. The image reproduction device according to claim 1, further comprising an input section capable of specifying an image size of said monitor image data, wherein:
said image processing section generates said monitor image data of the specified image size.

12. The image reproduction device according to claim 1, wherein:
said image processing section generates monitor image data of an image size having the highest resolution among the standards of said monitor device and transforms the image size of said monitor image data into the image resolution of each monitor device to generate a reproduction image at the time of reproduction.

13. The image reproduction device according to claim 1, further comprising a display interface that performs outputting to said monitor device.

14. The image reproduction device according to claim 13, wherein:
said display interface detects an image resolution of said monitor device; and
said image processing section generates said monitor image data of an image size corresponding to the detected image resolution.

15. The image reproduction device according to claim 1, wherein:
said control section generates management data for each monitor image data, in which the management data includes identification information about the photographic image data corresponding to the monitor image data and records said management data in said nonvolatile memory.

16. The image reproduction device according to claim 15, wherein:
the management data further includes identification information about the external recording device which is a recording destination of the photographic image data.

* * * * *